United States Patent [19]

Cutler et al.

[11] 4,009,330
[45] Feb. 22, 1977

[54] CIRCUIT FOR SELECTING FRAMES INDICATIVE OF STILL PICTURES

[75] Inventors: Cassius Chapin Cutler, Holmdel; John Ormond Limb, Tinton Falls, both of N.J.

[73] Assignee: Bell Telephone Laboratories, Incorporated, Murray Hill, N.J.

[22] Filed: Apr. 5, 1976

[21] Appl. No.: 673,631

[52] U.S. Cl. .......................... 358/83; 178/DIG. 3; 358/105; 358/133

[51] Int. Cl.² ........................................ H04N 7/12

[58] Field of Search .................. 178/6, 6.8, DIG. 3

[56] References Cited

UNITED STATES PATENTS

| | | | |
|---|---|---|---|
| 3,632,865 | 1/1972 | Haskell | 178/6 |
| 3,723,644 | 3/1973 | Haskell | 178/6.6 P |
| 3,890,462 | 6/1975 | Limb | 178/6.8 |

OTHER PUBLICATIONS

*IEEE Transactions on Broadcasting* vol. BC–17, No. 2 June 1971, "Some Design Considerations for Home Interactive Terminals", pp. 37–41.

*Primary Examiner*—Howard W. Britton
*Attorney, Agent, or Firm*—John Francis Moran

[57] ABSTRACT

Apparatus is disclosed for selecting video frames indicative of still pictures from successive video frames, a portion of which are indicative of moving objects and the remaining frames are indicative of still objects. The input and output video signal paths of a frame memory are completed through switches. A speed measurement circuit utilizes the signals at the input and output of the frame memory as the video signal is applied thereto to identify frames indicative of still objects. A logic circuit that operates the switches responds to the output of the speed measurement circuit by changing the position of the switches to retain the content of the frame memory and apply same to the output signal path. Timing circuits are also advantageously utilized to slow down the selection rate of frames indicative of still objects and force the selection of a more recent video frame when the speed of movement fails to fall below a predetermined value.

7 Claims, 1 Drawing Figure

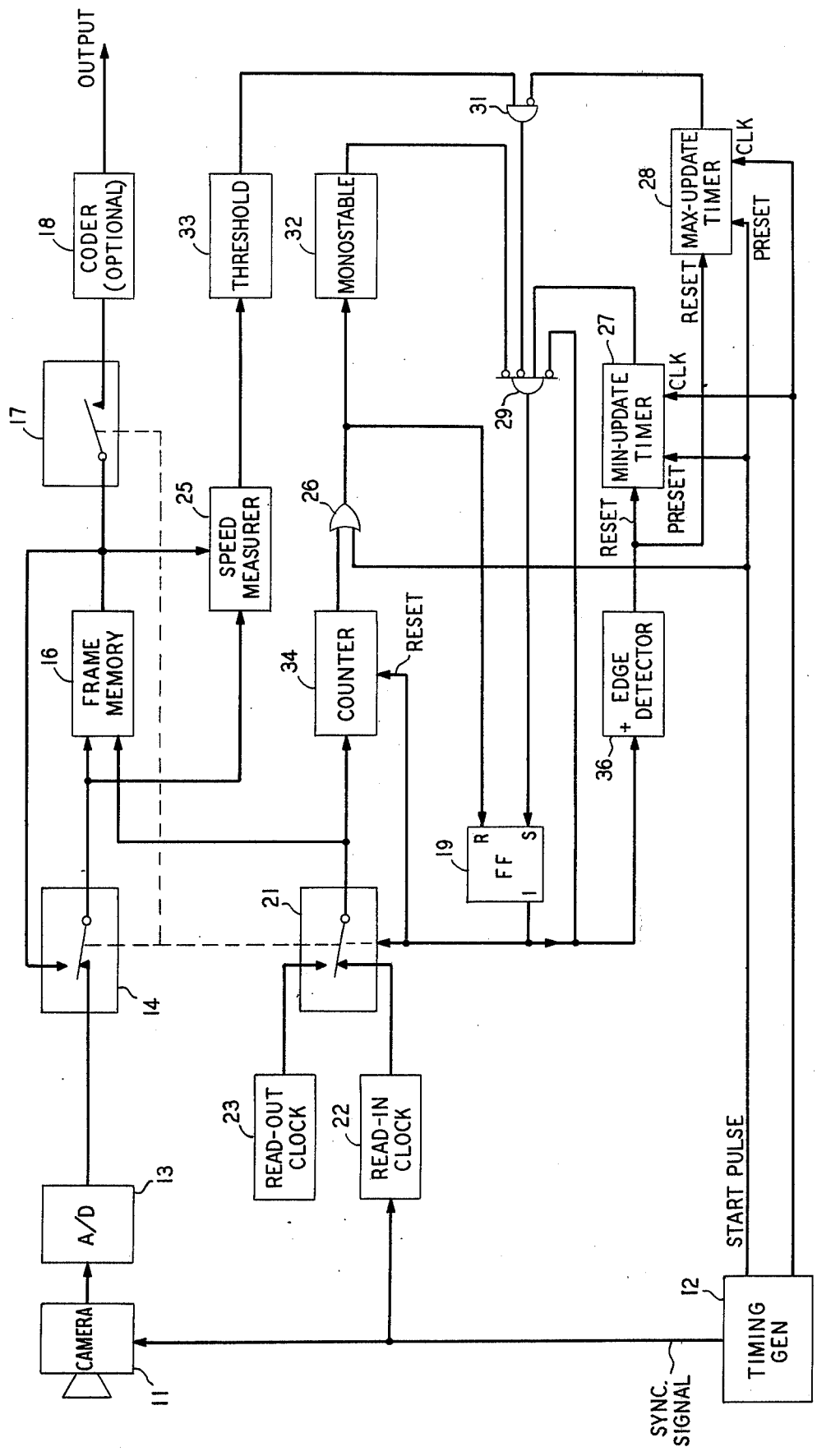

CIRCUIT FOR SELECTING FRAMES INDICATIVE OF STILL PICTURES

BACKGROUND OF THE INVENTION

This invention relates to television systems and, more particularly, to apparatus for selecting frames of video signals indicative of still pictures or motionless images from a succession of frames that includes a portion of frames indicative of moving images.

In the more technologically advanced countries of the world, no one doubts the impact television has as a source of moving picture communication and entertainment that is transmitted over nationwide broadcasting networks. In spite of this, still picture television transmission is growing in the number of present applications. The range of possible uses of still picture television appears to be expanding in such areas as: entertainment (games, puzzles, stories, etc.), management and business functions, advising and counseling, and specific services for handicapped persons. A primary advantage of still picture transmission is that it can be transmitted conveniently by a low transmission capacity media compatible with audio telephone signals and not over the crowded spectrum of the general broadcasting band. In the systems, storage is utilized at the receiver to retain each transmitted frame of video signals and each frame is repeated at the receiver to provide a flicker free picture until the next frame is transmitted.

Heretofore, the effort in still picture broadcasting has been primarily directed toward signal multiplexing, transmission, and other aspects of the system and little attention has been paid to the generation of suitable still picture frames. In face to face type communication via such systems, still pictures or snapshots of the subjects are automatically processed in accordance with the operation of the system. This produces the displeasing subjective effect of transmitting pictures of the subject in ungainly poses, for example, eyes shut, mouth open. Even in situations involving graphical displays, there is a possibility that the transmitted frame may occur as the display is changed and produce a smeared image that is repeated at the receiver. Since the number of different frames used to produce the picture at the receiver is much less in still picture systems than conventional systems, the contribution of each frame to the quality of the program material, whether beneficial or detractive, is far greater for still picture operation than for moving picture operation.

Accordingly, an object of the present invention is to improve the subjective quality of still picture broadcasting by the selection of frames indicative of motionless video images from the succession of frames produced by a video camera.

SUMMARY OF THE INVENTION

The invention in its various aspects improves the subjective quality of information over that produced by prior art still picture transmission systems utilizing an arrangement that measures speed of movement between video frames. Frames indicative of movement are discarded and frames indicative of motionless video images are retained for transmission.

In its broader aspects, successive frames of a video signal including frames indicative of still objects and frames indicative of moving objects are applied to a frame memory. The speed of movement between video frames is measured to identify the frames indicative of still objects. Switches responsive to the speed measurement control the application of the video signal to the frame memory and complete an output signal path from the memory. The switches and the frame memory jointly operate to retain frames indicative of still objects for application to the output signal path and discard frames indicative of moving objects.

In some of the more specific aspects of the invention, the frame memory is a dynamic memory which is clocked at two different rates to provide flexibility in the information rate within the frames produced as an output. If the speed of movement between video frames exceeds a predetermined value, the state of a binary signal prevents the frame in the dynamic memory from being retained. The switches are controlled by the output of a gate responsive to the speed of movement. When the circuit is producing a video signal output, a counter indicates the completion of a video frame and triggers a circuit that inhibits the gate from operating the switches until an accurate speed indication is produced. A timing circuit is also used to control the operation of the gate and provide overall operating restraints. More specifically, a minimum update interval is used to prevent relatively rapid production of output video frames and a maximum update interval is used to force an output of a more current frame when the speed of movement fails to fall below the predetermined value.

BRIEF DESCRIPTION OF THE DRAWING

Features of the invention and additional objects of the invention will be more readily appreciated and better understood by reference to the following detailed description which should be considered in conjunction with the drawing.

The sole FIGURE is a block diagram arranged to operate in accordance with the principles of the invention.

DETAILED DESCRIPTION

The FIGURE is a block diagram of an illustrative embodiment of the invention for selecting video frames of still images. Camera 11 is synchronized by timing generator 12 to provide a conventional analog video signal which is then converted into an $n$ bit pulse code modulated (PCM) digital video signal (e.g., $n = 8$) by analog-to-digital converter 13. Converter 13 produces, in a conventional manner, successive words of 8 bits which each represent the encoded intensity of illumination of a dot or a picture element that cumulatively provide the video image.

The through signal path for the video signal includes switch 14, frame memory 16, switch 17 and coder 18. Coder 18 is optional and may be desirable when the format of the PCM signal is changed to eliminate redundant information and/or to be compatible with a channel in a system for transmitting the video signal. Coder 18 may also take the form of a multiplexer if the transmission channel has sufficient capacity to be shared by a number of such arrangements shown in the FIGURE. If such a conversion is not necessary, coder 18 may be eliminated, of course, and the output signal is supplied directly by switch 17. The output level of flip-flop 19 determines the positions of switches 14 and 17. Switches 14 and 17 assume the positions shown in the FIGURE during initial operation. Frame memory 16 is a dynamic serial memory which operates in accordance with a clock signal selected by switch 21. Clocks 22 and 23 supply signals at two different rates to switch 21 which also is controlled by flip-flop 19. Timing generator 12 supplies a timing signal to synchronize read-in clock 22 at the rate of the incoming digital video signal. Clock 23 is used to supply the signal contents of memory 16 at a rate compatible with a suitable transmission medium.

The basic operation of the components in the FIGURE discussed thus far is that switch 14 applies successive frames of a video signal to frame memory 16. Once a frame occurs indicative of a still picture, speed measure circuit 25 produces an output which, in cooperation with the remaining circuitry in the FIGURE, changes the position of switch 14 to recirculate and retain the contents of memory 16 until the contents of the memory are transmitted to the channel through switch 17. Thus, only selected video frames, which are indicative of highly suitable still pictures, are retained in memory 16 for transmission to be displayed at a remote receiver.

Speed measurer 25 is of conventional design such as the type disclosed in U.S. Pat. No. 3,723,644 issued to B. G. Haskell and J. O. Limb on Mar. 27, 1973. FIG. 2 of the patent discloses a speed measurement circuit which basically compares the video information in two successive frames to each other to provide an output indication of movement that occurs between the frames. In the present arrangement, frame memory 16 may be utilized to take the place of frame delay 153 in FIG. 2 of the patent in addition to serving as a storage medium to provide an efficient arrangement of minimal complexity.

The remaining portion of the circuitry of the FIGURE will now be considered when operation is first commenced. Timing generator 12 produces a momentary start pulse which is applied to OR gate 26, minimum update timer 27, and maximum update timer 28. Timers 27 and 28 are conventional counters that run at a rate in accordance with a clock signal produced by timing generator 12. The start pulse is applied to an "override" preset input of minimum update timer 27. At this time, timer 27 is preset at a maximum count and locks up to produce a one output for four-input gate 29. Similarly, maximum update timer 28 is preset to a minimum value and produces a zero level signal which is applied to gate 31. The value of the preset for timers 27 and 28 may be a predetermined constant or changed by suitable means to provide a degree of flexibility in operation. The start pulse thus sets timers 27 and 28 such that the other circuitry in the FIGURE operates independently and controls the position of switches 14, 17 and 21.

At OR gate 26, the start pulse produces a one output to reset flip-flop 19 which forces switches 14, 17 and 21 to assume the position shown in the FIGURE. The output of OR gate 26 is also applied to monostable circuit 32. Monostable 32 produces an output pulse of a fixed duration which prevents the output of gate 29 from setting flip-flop 19. The duration of the pulse corresponds to the interval of two frames in the digital video signal applied to frame memory 16. Two complete frames must be applied to frame memory 16 before speed measurer 25 provides an accurate indication of movement between the two video frames. Hence, monostable 32 produces a pulse with a prolonged duration to maintain the zero output of gate 29 until speed measurer 25 provides an accurate speed indication.

Threshold circuit 33 compares the speed indication to a predetermined value and produces either a logical zero or one level signal to indicate respectively an absence of movement or movement for gate 31.

After the duration of two complete frames and as the output of threshold circuit 33 changes to a zero level, the output of gate 31 switches to a zero level and changes the output of gate 29 to a logical one level. The logical one level sets flip-flop 19 which changes the position of all of the switches in the FIGURE. Switch 14 now completes a feedback loop that recirculates the video frame in memory 16, which is the second one of the two video frames used to provide the absence of movement indication. Switch 17 simultaneously completes a conductive path for transmission of the frame stored in memory 16. Switch 21 is also activated to apply the output of read-out clock 23 to clock memory 16 and apply the stored contents to switch 17 at a rate compatible with the channel that transmits the video signal output. The output of clock 23 is also applied to counter 34. Counter 34 was reset to zero by the output of flip-flop 19 when it was set by gate 29. Counter 34 then proceeds to maintain a running count in accordance with the recirculated signals in frame memory 16. When a complete frame is recirculated through memory 16 and thus is applied to switch 17, counter 34 produces a logical one level of momentary duration. This signal triggers monostable 32 and resets flip-flop 19 which respectively respond by forcing the output of gate 29 to change to a logical zero level as two frames elapse in the incoming signal and by removing the inhibit input from the flip-flop. As flip-flop 19 is reset, switches 14, 17 and 21 are operated to again assume the positions shown in the FIGURE which terminates the video output signal and readies the circuit to start the selection of a new still picture frame.

After the pulse produced by monostable 32 elapses, an operation similar to initial start-up occurs except timers 27 and 28 now affect the operation which ensues. At the start of the last transmission, gate 29 produced a one level that changed the output of flip-flop 19 to a one level. This positive transition was sensed by detector 36 which, in turn, resets timers 27 and 28 to zero count. Both timers then increased their count in accordance with the clock pulses supplied by timing generator 12. During the interval counter 27 is running, it produces a zero output that prevents gate 29 from setting flip-flop 19 even though threshold circuit 33 may indicate that the content in frame memory 16 is indicative of a still picture. When timer 27 reaches a full count, it produces a logical one output which removes the inhibit from gate 29. At this time, any indication from threshold circuit 33 of a logical zero level will propagate through gate 31 and change the output of gate 29 to a logical one setting flip-flop 19 which begins the transmission phase of the operation. However, if this situation does not occur, timer 28 will reach a maximum count at a later time and produce a one output which forces gate 31 to produce a zero level output signal. The zero level output signal changes the output of gate 29 to a logical one level that sets flip-flop 19 and begins the transmission phase of operation. Thus timer 28, in effect, overrides operation of the speed measuring arrangement and forces transmission at periodic intervals in order to provide a remote receiver with more current information to display. On the other hand, timer 27 prevents relatively rapid transmission of closely occurring frames produced by camera 11. For certain types of program material this type of transmission, if not prevented, will produce a flickering display which is displeasing to watch.

It is to be understood that the arrangements disclosed in the foregoing are merely illustrative of the application of the principles of the present invention. In this case, an illustrative embodiment is disclosed to provide an arrangement of minimal complexity and yet provide certain desirable operational features. Accordingly, numerous and varied other arrangements including those of greater complexity and different operational features may be utilized by those skilled in the art without departing from the spirit and scope of the invention.

What is claimed is:

1. In combination,
    a signal source for supplying successive frames of a video signal including frames indicative of still objects and frames indicative of moving objects;
    storing means for retaining a frame of video signals;
    speed measuring means in circuit relationship with said storing means for determining the speed of movement between successive frames to indicate frames indicative of still objects,
    switching means responsive to said speed measuring means in circuit relationship with said storing means, said switching means controlling the application of the video signal to said storing means and completing an output signal path from said storing means, and
    said switching means and storing means cooperating by retaining frames indicative of still objects from the succession of frames for application to said output signal path and discarding frames indicative of moving objects.

2. A combination in accordance with claim 1 wherein said storing means is a dynamic memory having a clocking input and the combination further comprises means for clocking said dynamic memory at a first rate when the video signal is being applied thereto and at a second rate when said output signal path is completed by said switching means.

3. A combination in accordance with claim 2 wherein said speed measuring means comprises means for comparing the speed of movement to a predetermined value to produce a binary output having one state when movement is present and another state when there is an absence of movement.

4. A combination in accordance with claim 3 further comprising gating means disposed between said speed measuring means and said switching means, said gating means producing an output to activate said switching means in response to the output of said speed measuring means.

5. A combination in accordance with claim 4 further comprising counting means for indicating when the video signal applied to said output signal path constitutes a complete frame of video signals.

6. A combination in accordance with claim 5 further comprising inhibiting means responsive to the indication of said counting means and supplying an output signal to said gating means, said inhibiting means preventing the output of said speed measuring means from changing the output of said gating means before an accurate speed indication is produced by said speed measuring means.

7. A combination in accordance with claim 6 further comprising timing means responsive to said counting means and supplying at least one output to said gating means, said timing means having a first predetermined interval during which application of the contents of said memory to said output signal path is prevented to establish a maximum frame rate in the video signals applied to said output signal path, and said timing means having a second predetermined interval after which said gating means is forced to operate said switching means to supply a frame of video signals to said output signal path.

* * * * *